(12) United States Patent
Chandramouli et al.

(10) Patent No.: US 11,051,212 B2
(45) Date of Patent: *Jun. 29, 2021

(54) INTERWORKING WITH BEARER-BASED SYSTEM

(71) Applicant: NOKIA SOLUTIONS AND NETWORKS OY, Espoo (FI)

(72) Inventors: Devaki Chandramouli, Plano, TX (US); Rainer Liebhart, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/437,451

(22) Filed: Jun. 11, 2019

(65) Prior Publication Data

US 2019/0297541 A1    Sep. 26, 2019

Related U.S. Application Data

(63) Continuation of application No. 15/303,069, filed as application No. PCT/US2014/034134 on Apr. 15, 2014, now Pat. No. 10,334,485.

(51) Int. Cl.
*H04W 24/10* (2009.01)
*H04W 36/00* (2009.01)
(Continued)

(52) U.S. Cl.
CPC ..... *H04W 36/0055* (2013.01); *H04L 12/4633* (2013.01); *H04W 4/90* (2018.02);
(Continued)

(58) Field of Classification Search
None
See application file for complete search history.

(56) References Cited

U.S. PATENT DOCUMENTS 9,674,870 B1    6/2017   Chaganti
10,334,485 B2*  6/2019   Chandramouli .. H04W 36/0083
(Continued)

FOREIGN PATENT DOCUMENTS

CN    101222417 A    7/2008
CN    102197629 A    9/2011
(Continued)

OTHER PUBLICATIONS

Aug. 23, 2019 Office Action issued in Chinese Patent Application No. 201480079890.8.
(Continued)

*Primary Examiner* — Bunjob Jaroenchonwanit
(74) *Attorney, Agent, or Firm* — Squire Patton Boggs (US) LLP

(57) ABSTRACT

Systems, methods, apparatuses, and computer program products for interworking between bearer-less networks and bearer based networks are provided. One method includes receiving, by a network entity in a bearer-less network, a context request to obtain user equipment context information for a user equipment moving from the bearer-less network to a bearer-based network. The method may further include providing a context response comprising the context information to a network entity in the bearer-based network, the context information used to establish bearers for the user equipment to obtain internet protocol (IP) based services.

19 Claims, 12 Drawing Sheets

(51) Int. Cl.
*H04W 4/90* (2018.01)
*H04W 36/14* (2009.01)
*H04L 12/46* (2006.01)
*H04W 72/04* (2009.01)
*H04W 60/04* (2009.01)

(52) U.S. Cl.
CPC ........ *H04W 36/0011* (2013.01); *H04W 36/14* (2013.01); *H04W 72/042* (2013.01); *H04W 72/0413* (2013.01); *H04W 60/04* (2013.01)

(56) References Cited

U.S. PATENT DOCUMENTS

| | | |
|---|---|---|
| 2006/0141995 A1 | 6/2006 | Purnadi |
| 2009/0016282 A1 | 1/2009 | Gasparroni et al. |
| 2010/0165940 A1 | 7/2010 | Watfa |
| 2010/0246533 A1 | 9/2010 | Lundin et al. |
| 2010/0322189 A1 | 12/2010 | Qiang |
| 2011/0045834 A1 | 2/2011 | Kim |
| 2011/0158165 A1 | 6/2011 | Dwyer |
| 2012/0009952 A1 | 1/2012 | Zhang |
| 2012/0044868 A1 | 2/2012 | Faccin et al. |
| 2012/0054847 A1 | 3/2012 | Schultz |
| 2012/0110197 A1 | 5/2012 | Miklos et al. |
| 2012/0164979 A1 | 6/2012 | Bachmann |
| 2012/0295630 A1 | 11/2012 | Wang |
| 2013/0017801 A1 | 1/2013 | Shaikh |
| 2013/0344890 A1 | 12/2013 | Hahn |
| 2015/0237592 A1 | 8/2015 | Kim |
| 2015/0250009 A1 | 9/2015 | Kahn |
| 2015/0282070 A1 | 10/2015 | Salem |
| 2017/0164245 A1 | 6/2017 | Chai |
| 2017/0223521 A1 | 8/2017 | Jeong |

FOREIGN PATENT DOCUMENTS

| | | |
|---|---|---|
| CN | 102684755 A | 9/2012 |
| WO | 2013125919 A1 | 8/2013 |

OTHER PUBLICATIONS

First Office Action dated Mar. 28, 2019 corresponding to Chinese Patent Application No. 201480079890.8. No copy provided, per MPEP 609. Copy submitted in parent U.S. Appl. No. 15/303,069.
International Search Report & Written Opinion dated Nov. 25, 2014 corresponding to International Patent Application No. PCT/US2014/034134. No copy provided, per MPEP 609. Copy submitted in parent U.S. Appl. No. 15/303,069.
3GPP TS 23.401 V12.4.0 (Mar. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Mar. 2014, 302 pages. No copy provided, per MPEP 609. Copy submitted in parent U.S. Appl. No. 15/303,069.
3GPP TS 24.301 V12.4.0 (Mar. 2014), Technical Specification, 3rd Generation Partnership Project; Technical Specification Group Core Network and Terminals; Non-Access-Stratum (NAS) protocol for Evolved Packet System (EPS); Stage 3 (Release 12), Mar. 2014, 362 pages. No copy provided, per MPEP 609. Copy submitted in parent U.S. Appl. No. 15/303,069.
3GPP TS 23.401 V8.18.0 (Mar. 2013), 3rd Generation Partnership Project; Technical Specification Group Services and System Aspects; General Packet Radio Service (GPRS) enhancements for Evolved Universal Terrestrial Radio Access Network (U-TRAN) access (Release 8); 2013; pp. 1-238. No copy provided, per MPEP 609. Copy submitted in parent U.S. Appl. No. 15/303,069.
Nov. 24, 2017 Extended Search Report issued in European Patent Application No. 14889301.9. No copy provided, per MPEP 609. Copy submitted in parent U.S. Appl. No. 15/303,069.

* cited by examiner

INTERWORKING WITH BEARER-BASED SYSTEM

CROSS-REFERENCE TO RELATED APPLICATIONS

This is a continuation application of U.S. patent application Ser. No. 15/303,069, filed on Oct. 10, 2016, which is a 371 application of International Patent Application No. PCT/US2014/034134, filed on Apr. 15, 2014. The disclosures of the prior applications are hereby incorporated by reference in their entirety.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), and/or LTE-Advanced (LTE-A).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment is directed to a method that includes receiving, by a network entity in a bearer-less network, a context request to obtain user equipment context information for a user equipment moving from the bearer-less network to a bearer-based network. The method may further include providing a context response comprising the context information to a network entity in the bearer-based network, the context information used to establish bearers for the user equipment to obtain internet protocol (IP) based services.

Another embodiment is directed to an apparatus including means for receiving, by a network entity in a bearer-less network, a context request to obtain user equipment context information for a user equipment moving from the bearer-less network to a bearer-based network. The apparatus may further include means for providing a context response comprising the context information to a network entity in the bearer-based network, the context information used to establish bearers for the user equipment to obtain internet protocol (IP) based services.

Another embodiment is directed to an apparatus including at least one processor and at least one memory including computer program code. The at least one memory and the computer program code are configured, with the at least one processor, to cause the apparatus at least to receive a context request to obtain user equipment context information for a user equipment moving from a bearer-less network to a bearer-based network, and to provide a context response comprising the context information to a network entity in the bearer-based network, the context information used to establish bearers for the user equipment to obtain internet protocol (IP) based services.

Another embodiment is directed to a method that includes receiving, by a network entity in a bearer-based network, a tracking area update (TAU) to register with the bearer-based network, the tracking area update (TAU) being received from a user equipment moving from a bearer-less network to the bearer-based network. The method may further include initiating a context request to obtain context information from a network entity in the bearer-less network, and receiving the context information to establish bearers for the user equipment to obtain internet protocol (IP) based services.

Another embodiment is directed to an apparatus including means for receiving, by a network entity in a bearer-based network, a tracking area update (TAU) to register with the bearer-based network, the tracking area update (TAU) being received from a user equipment moving from a bearer-less network to the bearer-based network. The apparatus may further include means for initiating a context request to obtain context information from a network entity in the bearer-less network, and means for receiving the context information to establish bearers for the user equipment to obtain internet protocol (IP) based services.

Another embodiment is directed to an apparatus including at least one processor and at least one memory including computer program code. The at least one memory and the computer program code are configured, with the at least one processor, to cause the apparatus at least to receive a tracking area update (TAU) to register with a bearer-based network, the tracking area update (TAU) being received from a user equipment moving from a bearer-less network to the bearer-based network, to initiate a context request to obtain context information from a network entity in the bearer-less network, and to receive the context information to establish bearers for the user equipment to obtain internet protocol (IP) based services.

Another embodiment is directed to a method that includes detecting, by a user equipment, that the user equipment is moving from a bearer-less network to a bearer-based network. The method may further include initiating a tracking area update (TAU) message to register with the bearer-based network and simulating bearers by setting bearer context information within the TAU message to show that the user equipment supports two bearers.

Another embodiment is directed to an apparatus including means for detecting, by a user equipment, that the user equipment is moving from a bearer-less network to a bearer-based network. The apparatus may further include means for initiating a tracking area update (TAU) message to register with the bearer-based network and simulating bearers by setting bearer context information within the TAU message to show that the user equipment supports two bearers.

Another embodiment is directed to an apparatus including at least one processor and at least one memory including computer program code. The at least one memory and the computer program code are configured, with the at least one processor, to cause the apparatus at least to detect that the apparatus is moving from a bearer-less network to a bearer-based network, and to initiate a tracking area update (TAU) message to register with the bearer-based network and simulate bearers by setting bearer context information within the TAU message to show that the apparatus supports two bearers.

Another embodiment is directed to a method that includes receiving, by a network entity in a bearer-less network, an initial attach or tracking area update (TAU) request from a user equipment moving from a bearer-based network to the bearer-less network. The method may further include obtaining bearer context information from an entity of the bearer-based network, and retrieving a mapping of bearer quality of service (QoS) class identifier (QCI) to 5G QoS parameters including DiffServ code point (DSCP) values, other 5G QoS priority related values. The method may also include informing a gateway in the bearer-less network of the mapping and the use of packet filters that may be assigned to different bearers to set the DSCP values for the service data flows.

Another embodiment is directed to an apparatus including means for receiving, by a network entity in a bearer-less network, an initial attach or tracking area update (TAU) request from a user equipment moving from a bearer-based network to the bearer-less network. The apparatus may further include means for obtaining bearer context information from an entity of the bearer-based network, and means for retrieving a mapping of bearer quality of service (QoS) class identifier (QCI) to 5G QoS parameters including DiffServ code point (DSCP) values, other 5G QoS priority related values. The apparatus may also include means for informing a gateway in the bearer-less network of the mapping and the use of packet filters that may be assigned to different bearers to set the DSCP values for the service data flows.

Another embodiment is directed to an apparatus including at least one processor and at least one memory including computer program code. The at least one memory and the computer program code are configured, with the at least one processor, to cause the apparatus at least to receive an initial attach or tracking area update (TAU) request from a user equipment moving from a bearer-based network to a bearer-less network, to obtain bearer context information from an entity of the bearer-based network, to retrieve a mapping of bearer quality of service (QoS) class identifier (QCI) to 5G QoS parameters including DiffServ code point (DSCP) values, other QoS priority related values, to inform a gateway in the bearer-less network of the mapping and the use of packet filters that may be assigned to different bearers to set the DSCP values for the service data flows.

Another embodiment is directed to a method that includes detecting, by a user equipment, that the user equipment is moving from a bearer-based network to a bearer-less network, and performing initial attach to obtain internet protocol (IP) connectivity from the bearer-less network or performing a tracking area update (TAU) procedure to perform registration with the bearer-less network. When performing the initial attach or the TAU procedure, the method may include providing quality of service (QoS) information to the bearer-less network.

Another embodiment is directed to an apparatus including means for detecting, by a user equipment, that the user equipment is moving from a bearer-based network to a bearer-less network, and means for performing initial attach to obtain internet protocol (IP) connectivity from the bearer-less network or performing a tracking area update (TAU) procedure to perform registration with the bearer-less network. When performing the initial attach or the TAU procedure, the apparatus may further include means for providing quality of service (QoS) information to the bearer-less network.

Another embodiment is directed to an apparatus including at least one processor and at least one memory including computer program code. The at least one memory and the computer program code are configured, with the at least one processor, to cause the apparatus at least to detect that the apparatus is moving from a bearer-based network to a bearer-less network, to perform initial attach to obtain internet protocol (IP) connectivity from the bearer-less network or performing a tracking area update (TAU) procedure to perform registration with the bearer-less network. When performing the initial attach or the TAU procedure, the at least one memory and the computer program code may be further configured, with the at least one processor, to cause the apparatus at least to provide quality of service (QoS) information to the bearer-less network.

Another embodiment is directed to a method that includes initiating, by a network entity in a bearer-less network, handover of a user equipment from the bearer-less network to a bearer-based network, mapping quality of service (QoS) parameters from different service flows of the bearer-less network to Evolved Packet System (EPS) bearer level QoS of the bearer-based network, determining access point name (APN) to be used in the bearer-based network, providing APN information within EPS packet data network (PDN) connections in a relocation request forwarded to the bearer-based network to establish appropriate bearers for the user equipment, and sending a handover command to the user equipment to trigger handover to the bearer-based network.

Another embodiment is directed to an apparatus including means for initiating, by a network entity in a bearer-less network, handover of a user equipment from the bearer-less network to a bearer-based network, means for mapping quality of service (QoS) parameters from different service flows of the bearer-less network to Evolved Packet System (EPS) bearer level QoS of the bearer-based network, means for determining access point name (APN) to be used in the bearer-based network, means for providing APN information within EPS packet data network (PDN) connections in a relocation request forwarded to the bearer-based network to establish appropriate bearers for the user equipment, and means for sending a handover command to the user equipment to trigger handover to the bearer-based network.

Another embodiment is directed to an apparatus including at least one processor and at least one memory including computer program code. The at least one memory and the computer program code are configured, with the at least one processor, to cause the apparatus at least to initiate handover of a user equipment from a bearer-less network to a bearer-based network, to map quality of service (QoS) parameters from different service flows of the bearer-less network to Evolved Packet System (EPS) bearer level QoS of the bearer-based network, to determine access point name (APN) to be used in the bearer-based network, to provide APN information within EPS packet data network (PDN) connections in a relocation request forwarded to the bearer-based network to establish appropriate bearers for the user equipment, and to send a handover command to the user equipment to trigger handover to the bearer-based network.

Another embodiment is directed to a method that includes receiving, by a network entity in a bearer-based network, a relocation request comprising access point name (APN) information for establishing appropriate bearers for a user equipment handover from a bearer-less network to the bearer-based network. The method may also include preparing for the handover by setting up general packet radio service (GPRS) tunnelling protocol (GTP) tunnels for the user equipment based in part on the received APN information, and confirming establishment of the appropriate bearers to the bearer-less network.

Another embodiment is directed to an apparatus including means for receiving, by a network entity in a bearer-based network, a relocation request comprising access point name (APN) information for establishing appropriate bearers for a user equipment handover from a bearer-less network to the bearer-based network. The apparatus may also include means for preparing for the handover by setting up general packet radio service (GPRS) tunnelling protocol (GTP) tunnels for the user equipment based in part on the received APN information, and means for confirming establishment of the appropriate bearers to the bearer-less network.

Another embodiment is directed to an apparatus including at least one processor and at least one memory including computer program code. The at least one memory and the computer program code are configured, with the at least one processor, to cause the apparatus at least to receive a relocation request comprising access point name (APN) information for establishing appropriate bearers for a user equipment handover from a bearer-less network to a bearer-based network, to prepare for the handover by setting up general packet radio service (GPRS) tunnelling protocol (GTP) tunnels for the user equipment based in part on the received APN information, and to confirm establishment of the appropriate bearers to the bearer-less network.

Another embodiment is directed to a method that includes receiving, by a network entity in a bearer-less network, an indication that handover of a user equipment from a bearer-based network to the bearer-less network is required, and preparing for the handover by setting up at least one generic routing encapsulation (GRE) tunnel for the user equipment. The method may further include mapping quality of service (QoS) class identifier (QCI) values retrieved from the bearer-based network to 5G QoS parameters including DiffServ code point (DSCP) values, other QoS priority related values providing the mapping to a gateway in the bearer-less network and use of packet filters that may be assigned to different bearers to set the DSCP values for the service data flows, receiving a tracking area update (TAU) message from the user equipment executing handover, and confirming establishment of bearers to the bearer-based network and de-activating tunnel(s) established for data forwarding.

Another embodiment is directed to an apparatus including means for receiving, by a network entity in a bearer-less network, an indication that handover of a user equipment from a bearer-based network to the bearer-less network is required, and means for preparing for the handover by setting up at least one generic routing encapsulation (GRE) tunnel for the user equipment. The apparatus may further include means for mapping quality of service (QoS) class identifier (QCI) values retrieved from the bearer-based network to 5G QoS parameters including DiffServ code point (DSCP) values, other QoS priority related values providing the mapping to a gateway in the bearer-less network and use of packet filters that may be assigned to different bearers to set the DSCP values for the service data flows, means for receiving a tracking area update (TAU) message from the user equipment executing handover, and means for confirming establishment of bearers to the bearer-based network and de-activating tunnel(s) established for data forwarding.

Another embodiment is directed to an apparatus including at least one processor and at least one memory including computer program code. The at least one memory and the computer program code are configured, with the at least one processor, to cause the apparatus at least to receive an indication that handover of a user equipment from a bearer-based network to a bearer-less network is required, to prepare for the handover by setting up at least one generic routing encapsulation (GRE) tunnel for the user equipment, to map quality of service (QoS) class identifier (QCI) values retrieved from the bearer-based network to DiffServ code point (DSCP) values, 5G QoS parameters including DiffServ code point (DSCP) values, other QoS priority related values provide the mapping to a gateway in the bearer-less network and use of packet filters that may be assigned to different bearers to set the DSCP values for the service data flows, to receive a tracking area update (TAU) message from the user equipment executing handover, and to confirm establishment of bearers to the bearer-based network and de-activate tunnel(s) established for data forwarding.

Another embodiment is directed to a method that includes detecting, by a network entity in a bearer-based network, that handover of a user equipment from the bearer-based network to a bearer-less network is required. The method may also include determining which entity in the bearer-less network controls an access point that will serve the user equipment, initiating handover and providing bearer context information in a relocation request forwarded to the entity in the bearer-less network, and creating a tunnel to perform data forwarding and informing an evolved node B (eNB) in the bearer-based network that handover can be triggered with a handover command.

Another embodiment is directed to an apparatus including means for detecting, by a network entity in a bearer-based network, that handover of a user equipment from the bearer-based network to a bearer-less network is required. The apparatus may also include means for determining which entity in the bearer-less network controls an access point that will serve the user equipment, means for initiating handover and providing bearer context information in a relocation request forwarded to the entity in the bearer-less network, and means for creating a tunnel to perform data forwarding and informing an evolved node B (eNB) in the bearer-based network that handover can be triggered with a handover command.

Another embodiment is directed to an apparatus including at least one processor and at least one memory including computer program code. The at least one memory and the computer program code are configured, with the at least one processor, to cause the apparatus at least to detect that handover of a user equipment from a bearer-based network to a bearer-less network is required, to determine which entity in the bearer-less network controls an access point that will serve the user equipment, to initiate handover and provide bearer context information in a relocation request forwarded to the entity in the bearer-less network, and to create a tunnel to perform data forwarding and inform an evolved node B (eNB) in the bearer-based network that handover can be triggered with a handover command.

Another embodiment is directed to a method that includes receiving, by an access point in a bearer-less network, information about an evolved node B (eNB) and mobility management entity (MME) of a bearer-based network, the information being received from a user equipment moving from the bearer-based network to the bearer-less network. The method may also include using the information to obtain user equipment context information from the eNB, and routing the user equipment to an appropriate access control server.

Another embodiment is directed to an apparatus including means for receiving, by an access point in a bearer-less network, information about an evolved node B (eNB) and mobility management entity (MME) of a bearer-based network, the information being received from a user equipment moving from the bearer-based network to the bearer-less network. The apparatus may also include means for using the information to obtain user equipment context information from the eNB, and means for routing the user equipment to an appropriate access control server.

Another embodiment is directed to an apparatus including at least one processor and at least one memory including computer program code. The at least one memory and the computer program code are configured, with the at least one processor, to cause the apparatus at least to receive information about an evolved node B (eNB) and mobility management entity (MME) of a bearer-based network, the information being received from a user equipment moving from the bearer-based network to a bearer-less network, to use the information to obtain user equipment context information from the eNB, and to route the user equipment to an appropriate access control server.

Another embodiment is directed to a method that includes detecting, by a user equipment, that the user equipment is moving from a bearer-based network to a bearer-less network. The method may also include providing, to an access point in the bearer-less network, information about an evolved node B (eNB) and mobility management entity (MME) of the bearer-based network, and executing handover from the bearer-based network to the bearer-less network.

Another embodiment is directed to an apparatus including means for detecting, by a user equipment, that the user equipment is moving from a bearer-based network to a bearer-less network. The apparatus may also include means for providing, to an access point in the bearer-less network, information about an evolved node B (eNB) and mobility management entity (MME) of the bearer-based network, and means for executing handover from the bearer-based network to the bearer-less network.

Another embodiment is directed to an apparatus including at least one processor and at least one memory including computer program code. The at least one memory and the computer program code are configured, with the at least one processor, to cause the apparatus at least to detect that the apparatus is moving from a bearer-based network to a bearer-less network, to provide, to an access point in the bearer-less network, information about an evolved node B (eNB) and mobility management entity (MME) of the bearer-based network, and to execute handover from the bearer-based network to the bearer-less network.

Other embodiments may be directed to computer program (s), embodied on a computer readable medium and configured to control a processor to perform any of the methods described herein.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for interworking with bearer based networks (e.g., LTE), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
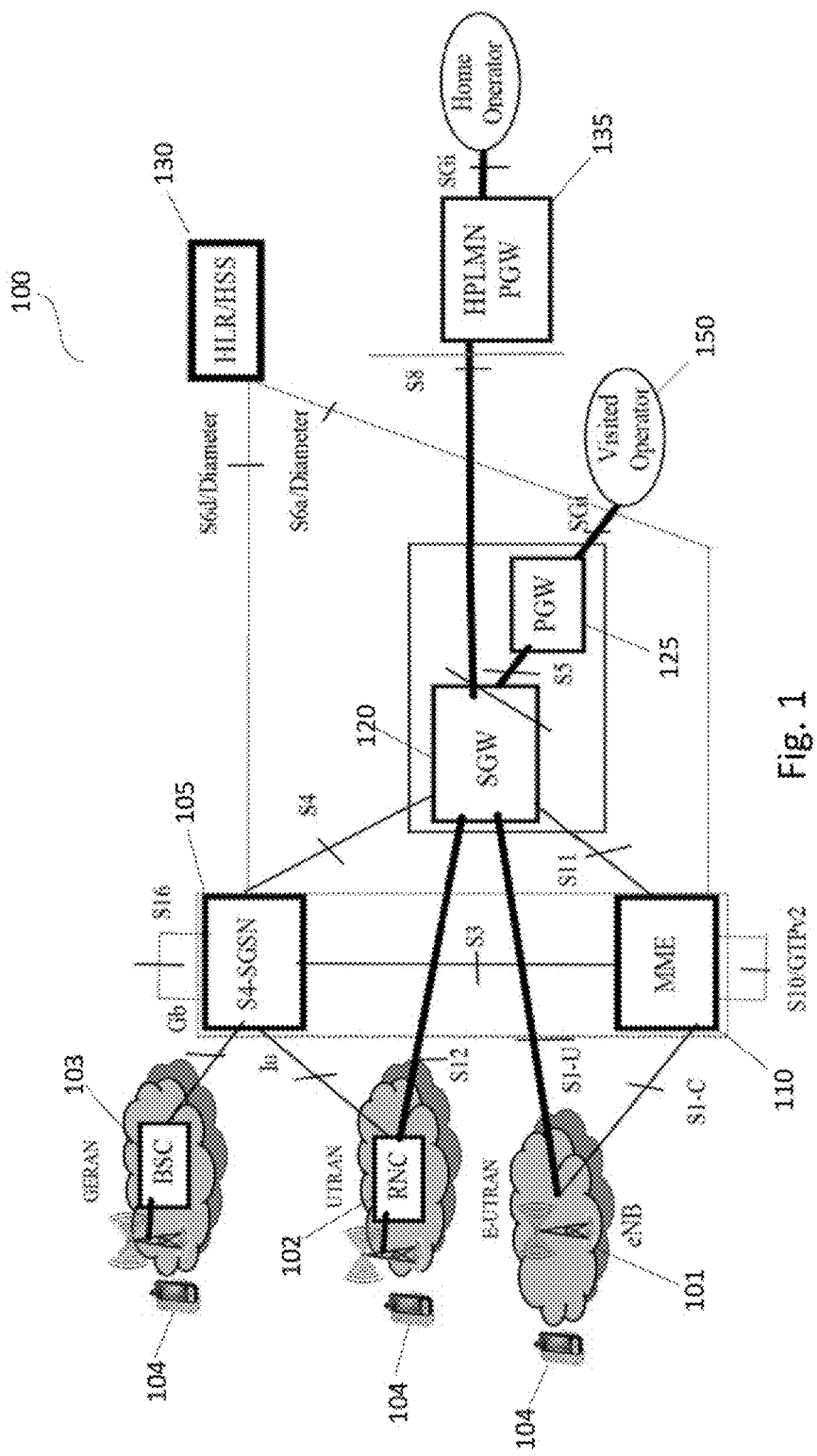
FIG. 1 illustrates a system according to an embodiment.

The evolved packet system (EPS) is the evolution of the general packet radio system (GPRS). EPS provides a new radio interface and new evolved packet core (EPC) network functions for broadband wireless data access. FIG. 1 illustrates an example of the EPS core network 100, according to an embodiment. As illustrated in FIG. 1, the EPS core network 100 includes the Mobility Management Entity (MME) 110, Packet Data Network Gateway (PGW) 125, and Serving Gateway (SGW) 120. MME 110 is connected to SGW 120 via the S1 interface, and the SGW 120 in turn is connected to PGW 125 via the S5 interface.

A common packet domain core network, such as EPS core network 100, can be used to provide core network functionality to the base station controller (BSC) 103 of the GSM/Edge radio access network (GERAN), the radio network controller (RNC) 102 of the UTRAN, and the eNodeB (eNB) 101 of the E-UTRAN.

MME 110 is considered the main control node for the core network 100. Some features handled by MME 110 include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information. Functions of the HLR/HSS 130 are related to mobility management, call and session establishment support, user authentication and access authorization.

SGW 120 is a data plane element within the core network 100. SGW 120 manages user plane (UP) mobility, acts as local mobility anchor and provides an UP interface to the radio access network(s). SGW 120 maintains the data path between the eNBs 101 and PGW 125. SGW 120 may also be in communication with home public land mobile network (HPLMN) PGW 135. PGW 125 provides connectivity for the UE to external packet data networks (PDNs). A UE 104 may have connectivity with more than one PGW 125 for accessing multiple PDNs 150.

A serving GPRS support node (SGSN) 105 may be provided in the core network 100 to transfer information to and from the GERAN and UTRAN via an Iu interface, for example. SGSN 105 communicates with SGW 120 via the S4 interface. SGSN 105 stores location information for a UE, such as routing area, and stores also user profiles, such as international mobile subscriber identity (IMSI).

One of the main principles behind EPS is the "always on" concept. When a UE performs initial attach, a default bearer is established and an IP address is allocated, and this remains until the UE is detached. In order to ensure that the UE is "always on", when the last bearer is deactivated, the UE is detached from the network.

Now, $5^{th}$ generation wireless systems (5G) is an important research topic in the industry. A new 5G partnership project initiative is being funded by the EU in order for the industry to participate and reach consensus on the relevant topics. One of the key motivations with the new architecture for 5G is to address the shortcomings of the LTE architecture.

One such shortcoming in LTE is the bearer concept. The user internet protocol (IP) traffic is transported through the cellular access network by using dedicated bearer services that is point-to-point connections. One user may have configured multiple bearer services for different e-2-e service types/classes and these bearer services are configured over the radio link connection and the access network connections so that the termination point is at the PGW that provides the bridging function towards the native IP access networks.

Some drawbacks have been identified with the bearer concept, including the following:

- Bearer based quality of service (QoS) has some limitations if the same bearer is used for transmitting packets from different applications (e.g., Web browsing, traffic from Facebook™ Skype™, YouTube™ with different QoS needs);
- As long as services can be differentiated via 5-tuples, EPS bearers can be used. But this is not possible for all services, either because they do not differ in the 5-tuple or 5-tuples need to change very dynamically (e.g., when embedded content in a HTML page is loaded from a server), which makes rapid and frequent updates in UE and PGW impossible.
- Additional signaling is required to establish, tear down bearers, modify traffic flow templates (TFTs), etc.

In order to overcome these limitations, there is a strong urge to design 5G systems without introducing a bearer concept. However, LTE networks require the device to support at least one bearer for the UE to remain registered. Thus, interworking is a major problem that needs to be solved for UE(s) that move between 5G and LTE networks both during idle mode and connected mode. Also, service continuity is critical in order to support real time communication services that are supported over LTE and 5G networks (e.g., voice, critical communication etc.).

One embodiment of the invention provides a solution that allows interworking and seamless service continuity between bearer-less (e.g., 5G) networks and bearer-based (e.g., LTE) networks. Furthermore, certain embodiments also provide architectural enhancements for interworking between bearer-based (e.g., LTE) and bearer-less (e.g., 5G) systems.

Certain embodiments provide solutions for at least the following scenarios:

1. Idle Mode Mobility:
   a. From bearer-less (e.g., 5G) network to bearer-based (e.g., LTE) network.
   b. From bearer-based (e.g., LTE) network to bearer-less (e.g., 5G) network
2. Connected Mode Handover
   a. Network initiated handover from bearer-less (e.g., 5G) to bearer-based (e.g., LTE)
   b. Network initiated handover from bearer-based (e.g., LTE) to bearer-less (e.g., 5G)
   c. UE initiated handover from bearer-less (e.g., 5G) to bearer-based (e.g., LTE)
   d. UE initiated handover from bearer-based (e.g., LTE) to bearer-less (e.g., 5G)

It should also be noted that a challenging aspect is the mobility/handover from bearer-less (e.g., 5G) networks to bearer-based (e.g., LTE) networks, since this requires adaptability of the new system with the legacy/target system; while there is more freedom for definition of the procedure and necessary optimizations for mobility/handover from bearer-based (e.g., LTE) to bearer-less (e.g., 5G) networks, since the target is a new system.

One embodiment is directed to an architecture for interworking between bearer-less and bearer-based networks. The following are some assumptions for interworking, according to this embodiment:

In this embodiment, the UE may register with the network and is assigned an IP address without the need to create separate bearer contexts.

This embodiment can abide by the rules of the legacy networks (i.e., should not require software upgrade of existing deployed network elements or should a least minimize required updates)

In this embodiment, seamless service continuity can be offered from user perspective (i.e., IP address preservation, satisfactory user experience)

Should not require the UE to perform a new attach for every inter RAT mobility (connected mode HO and idle mode mobility)

Figure 2:
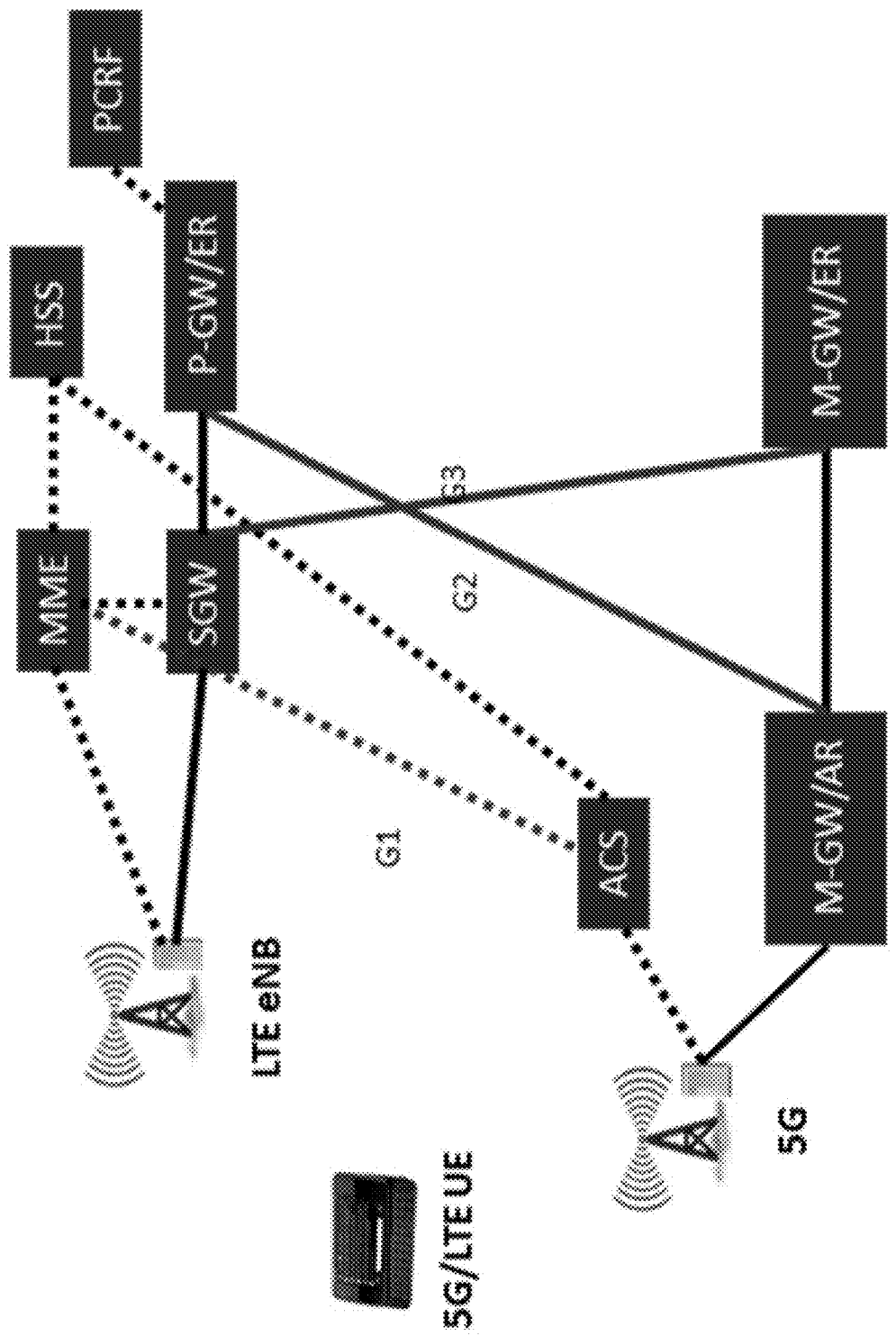
FIG. 2 illustrates a system according to one embodiment.

FIG. 2 illustrates an example interworking architecture, according to an embodiment. While FIG. 2 illustrates an architecture for interworking between 5G and LTE, it should be noted that embodiments of the invention are similarly applicable for interworking between other bearer-less networks and bearer based networks. As illustrated in FIG. 2, in this embodiment, it is assumed that 5G networks (following a bearer-less network model) and LTE networks (following a bearer-based model) have a direct interface to enable interworking between the 5G and LTE networks.

The LTE network architecture is well-known from 3GPP TS 23.401. The 5G architecture, as illustrated in the example of FIG. 2, may include network elements such as a 5G access point (AP) 201, access control server (ACS) 210, mobility gateway access router (M-GW/AR) 215, mobility gateway edge router (M-GW/ER) 220. It should be noted that the 5G architecture model may follow general design principles known from mobile networks like LTE (e.g., presence of a local and global mobility anchor, concept for idle mode mobility).

The 5G AP(s) 201 serve the 5G radio capable UEs and they may form a wireless cluster with self-backhauled APs (sbAP as a relay node) and a gateway AP (gwAP) with interface to an Ethernet fixed LAN. The 5G wireless cluster may support Ethernet switching over the 5G radio interfaces.

The ACS 210 (or eMME) is the network control entity in charge of controlling user access to the network. It authenticates and authorizes users and hosts, enforces policies for 5G QoS (e.g., DiffServ and QoS related parameters), and performs location management.

The M-GW 215, 220 is an IP router that is seen as the next hop router (or default router) to the hosts connected to the 5G local area network. M-GW/AR 215 is the access router while M-GW/ER 220 acts as an edge router that connects to external networks.

Some additional functional requirements that may be needed for interworking include: the UE needs to support both 5G and LTE radio technologies, M-GW/AR 215 acts as an S-GW and M-GW/ER 220 acts as a P-GW when it interworks with LTE, M-GW/AR 215 and M-GW/ER 220 may support generic routing encapsulation (GRE) tunneling protocol (or other tunneling protocols) in order to support L2 tunneling of Ethernet packets within 5G networks. In order to support interworking with LTE networks, M-GW/AR 215 and M-GW/ER 220 may need to also support general packet radio service (GPRS) tunnelling protocol (GTP). In an embodiment, ACS 210 (evolved MME) in the 5G architecture acts like an MME/SGSN towards the LTE network. It is able to provide the user's context information to the 5G network as required by the LTE network. According to an embodiment, a new trigger may be introduced for the UE to perform tracking area update (TAU) with "active flag" and provide bearer context information element (IE). UE can have the ability to check if IP connectivity is provided without bearers and may be able to simulate the presence of bearer contexts when it moves to a LTE network.

The need to interwork with a LTE network may result in the addition of three new reference points. As illustrated in the example of FIG. 2, these reference points include: 1) MME to ACS (G1); 2) M-GW/ER to S-GW (G2); and 3) M-GW/AR to P-GW (G3).

One embodiment includes a procedure for idle mode mobility, for example from a 5G network to a LTE network. This embodiment will be explained with the following example. In this example, the UE wants to use operator offered services using IMS. In LTE, it has to use IMS-APN, QCI=5 default bearer for signalling and QCI=1 dedicated bearer for voice.

The UE registers in the 5G network to obtain operator services, such as IMS and internet access. As in LTE, the UE can indicate its wish to use IMS services by providing a special APN or a FQDN to the network. The UE is assigned IP addresses (possibly one for IMS access and another one for Internet access) but no bearer context exists in case of 5G access. GRE or MIP tunnel is established between 5GAP, M-GW/AR and M-GW/ER for routing the user plane packets and provide mobility support. The user plane packets are routed from UE to 5GAP to M-GW/AR to M-GW/ER to IMS/Internet.

Figure 3:
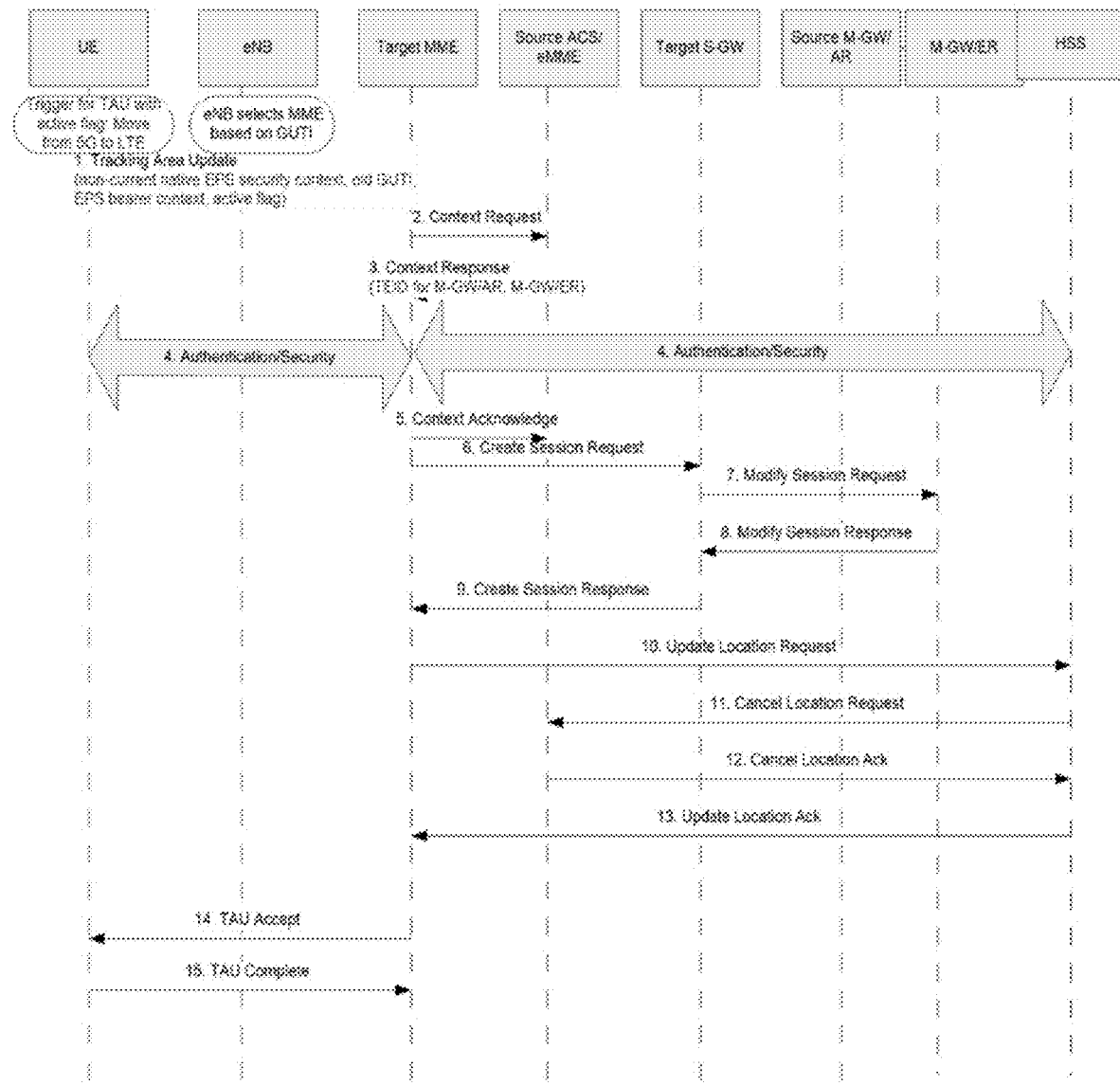
FIG. 3 illustrates a signaling diagram according to an embodiment.

FIG. 3 illustrates an example signalling diagram to accomplish the interworking and idle mode mobility, for example from 5G network to LTE network, according to one embodiment. First, the UE may detect that it is moving from a 5G network to LTE network. The UE checks if it has a valid IP address that was previously allocated by the network, but no bearer context exists in case of 5G access. Then, the UE may initiate TAU in order to register with the E-UTRAN network and simulates the bearers by setting the bearer context information within TAU message to show that the UE supports 2 bearers (i.e., setting EBI 5=1 within EPS bearer context). It may also include the "active flag" within TAU in order to ensure appropriate radio bearers and S1 bearers are established in order to receive operator offered services using IMS.

In this embodiment, during TAU procedure, the target MME initiates context request to obtain UE context information from the source ACS/eMME. Next, the source ACS/eMME may provide connection/context information to the target MME to ensure necessary bearers are established for the UE to obtain IMS and Internet (or any other) services. In case of idle mode mobility, ongoing data flows do not exist and ACS may request just the establishment of IMS and Internet PDN connections with the necessary bearers and QoS. This request can be based on services potentially used by the UE (known to the network by usage of an APN, UE's IP addresses that is specific to a certain PDN, subscribed services in HSS/AAA, or any other appropriate information). Required EPC QoS parameters can be retrieved from HSS or locally configured in ACS/eMME (e.g., map 5G QoS parameters like specific DiffServ code point (DSCP) values, other 5G QoS priority related values to EPC QoS parameters like QoS class identifier (QCI)/ allocation and retention priority (ARP)). The source ACS/eMME may obtain tunnel endpoint identifier (TEID) information from M-GW/AR and M-GW/ER and provide it within the context response to target MME in order to establish GTP tunnels in the LTE network. The MME decides whether S-GW relocation is needed. If S-GW relocation is needed, then it establishes necessary GTP tunnels between eNB, new S-GW and old M-GW/ER. Otherwise, it establishes necessary GTP tunnels between eNB, old M-GW/AR and old M-GW/ER.

The following are possible alternatives for user plane establishment after idle mode mobility:
1. IP address for the UE remains the same and user plane is terminated at the M-GW/ER (old anchor point). Also, user plane goes through M-GW/AR in the 5G network. UP after mobility: eNB→M-GW/AR→M-GW/ER.
2. IP address for the UE remains the same and user plane is terminated at the M-GW/ER (old anchor point). User plane relocated from M-GW/AR in the 5G network to S-GW in the LTE network. UP after mobility: eNB→S-GW→M-GW/ER.

FIG. 3 illustrates an example according to option 2.

Another embodiment includes a procedure for idle mode mobility, for example from a LTE network to a 5G network. This embodiment will be explained with the following example. In this example, the UE wants to use operator offered services using IMS. In LTE, the UE uses IMS-APN, QCI 5 default bearer for signalling and QCI 1 dedicated bearer for voice.

In this example, the UE is registered in a LTE network and is assigned an IP address. The UE is connected to IMS APN and has 2 bearers—QCI 5 default bearer for IMS signaling, QCI 1 dedicated bearer for voice. User plane for the UE is routed from UE to eNB to S-GW to P-GW to IMS network.

According to this embodiment, if the UE moves from a LTE network to a 5G network during idle mode, the UE can perform either initial attach to obtain IP connectivity from the 5G network or it can perform TAU procedure to perform registration with the 5G network during idle mode mobility. When the UE performs initial attach or TAU to obtain IP connectivity from the 5G network, it can provide necessary QoS information (so called UE requested QoS information) during this procedure. The target ACS/eMME may obtain context information from source MME. The source MME may provide bearer context information (APN, bearer level QoS). Service flows in the different bearers are treated differently in 5G (e.g., via different DSCP marking), this can be achieved, if ACS/eMME has a mapping table from bearer QCI to DiffServ code point (DSCP) values or retrieves this information from the HSS and informs the S-GW or M-GW/AR of the mapping. The target network decides whether S-GW relocation is necessary. P-GWs are not changed. Target network establishes necessary GTP tunnels towards the P-GW.

In an embodiment, the UE can also indicate the type of service requested by including the service name (e.g., APN, FQDN, service URL). The network can use this information to choose the appropriate M-GW/ER to establish the session. Also, network can decide whether user plane anchor should be moved from P-GW to M-GW/ER (this is only possible in idle mode). The user plane can be relocated from S-GW in LTE to M-GW/AR in the 5G network.

Another embodiment is directed to a procedure for connected mode handover, for example from a 5G to a LTE network. In principle, connected mode handover can be initiated either by the UE or the network.

First, an example of network initiated handover is provided, according to one embodiment. In this example, the UE wants to use operator offered services using IMS. In LTE, the UE uses IMS-APN, QCI=5 default bearer for signalling and QCI=1 dedicated bearer for voice.

The UE registers in the 5G network to obtain operator services and internet access. As in LTE, the UE can indicate its wish to use IMS services by providing a special APN or FQDN to the network. The UE is assigned an IP address but no bearer context. GRE or MIP tunnel is established between 5GAP, M-GW/AR and M-GW/ER for routing the user plane. The user plane for the UE is routed from UE to 5GAP to M-GW/AR to M-GW/ER to IMS network.

Figure 4:
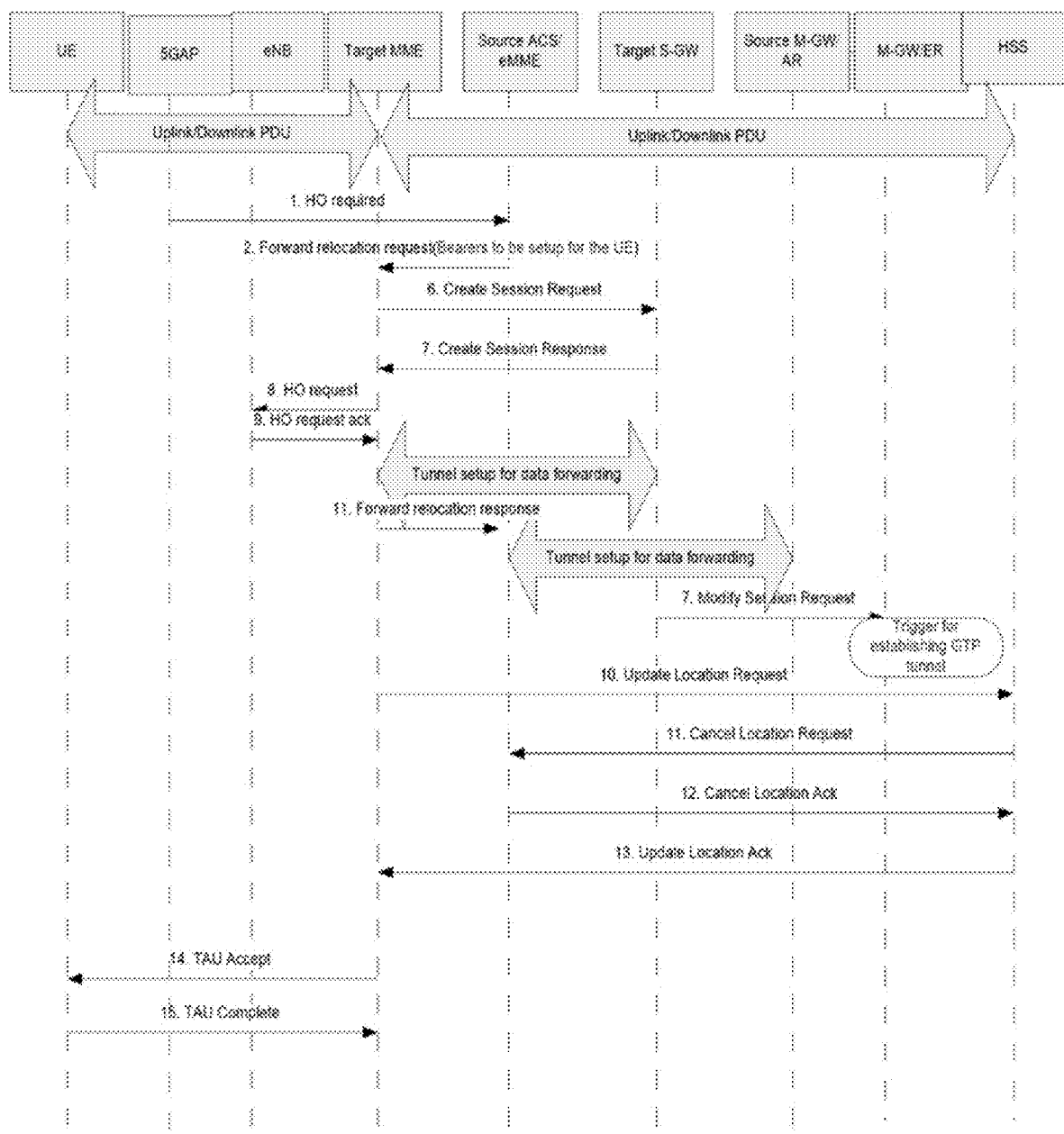
FIG. 4 illustrates a signaling diagram according to another embodiment.

FIG. 4 illustrates an example signalling diagram for interworking and network initiated connected mode handover preparation, for example from 5G to LTE, according to an embodiment. E-UTRAN S1 handover procedure (with MME relocation) is performed as defined in 3GPP TS 23.401 with the following additions/modifications during connected mode handover from 5G network to LTE network.

During handover preparation phase, based on UE mobility, current location, measurement and other parameters, 5GAP determines that handover is required to another RAT and informs ACS/eMME that handover is required. Based on the target eNB indicator, ACS/eMME detects that inter RAT handover is required. If the target eNB is not being served by the ACS/eMME, it may determine the target MME that controls the eNB, initiate the handover and provide necessary information about the service flows. The source ACS/eMME maps 5G QoS parameters from the different service flows (e.g., based on all or a subset [highest priority ones] of used DSCP values retrieved from the M-GW/ER or M-GW/AR; the mapping of DSCP values to EPC bearers might be 1-1 or n-1; these DSCP values will for example include the DSCP marking for IMS dedicated bearers for signalling and voice, it could also be based on other QoS priority indicators defined for 5G) to EPS bearer level QoS (QCI, ARP, etc.), determines APN to be used in LTE network based on the anchor GW/UE IP address and provides APN information within EPS PDN connections in the forward relocation request to ensure that the target network establishes appropriate bearers (e.g., IMS APN, QCI 5, QCI 1 bearers for the sample scenario) for the UE. The target network may decide whether M-GW/AR needs to be relocated to S-GW in the LTE network and based on that decision and QoS, APN information, target MME prepares for the HO by setting up necessary GTP tunnels for the UE. The source ACS/eMME may prepare for data forwarding from source to target to ensure data integrity and may create a tunnel to perform data forwarding and informs the 5GAP that handover can be triggered with HO command. The UE may execute the handover by sending a handover indication to the eNB and a TAU to the MME.

During handover execution phase, the target MME may confirm the establishment of bearers towards the source ACS/eMME and may deactivate the tunnel established for data forwarding. The source ACS/eMME may use this trigger to deactivate the GRE tunnel(s) that were established in 5G network for the UE.

The following are the possible alternatives for user plane establishment after connected mode handover:
1. IP address for the UE remains the same and user plane is terminated at the M-GW/ER (old anchor point). UP after mobility: eNB→M-GW/AR→M-GW/ER.
2. IP address for the UE remains the same and user plane is terminated at the M-GW/ER (old anchor point). User plane relocated from M-GW/AR in the 5G network to S-GW in the LTE network. UP after mobility: eNB→S-GW→M-GW/ER.

FIG. 4 illustrates an example according to option 2.

An example of UE initiated handover is provided, according to an embodiment. The UE may try to move towards E-UTRAN network directly. In this case, the handover preparation phase may be skipped. The procedure for connected mode handover from a 5G network towards a LTE network may be similar to the procedure that occurs when RRC redirection is performed from 2G/3G network towards LTE network. In an embodiment, as an example of UE initiated handover, the UE wants to use operator offered services using IMS. In LTE, the UE uses IMS-APN, QCI 5 default bearer for signalling and QCI 1 dedicated bearer for voice.

In this example, the UE registers in the 5G network to obtain operator services and internet access. The UE is assigned an IP addresses but no bearer context. GRE or MIP tunnel is established between 5GAP, M-GW/AR and M-GW/ER for routing user plane. The user plane for the UE is routed from UE to 5GAP to M-GW/AR to M-GW/ER to IMS network.

In this embodiment, the UE may detect that it is moving from a 5G network to a LTE network. The UE may check if it has a valid IP address that was previously allocated by the network but no bearer context exists. The UE may then initiate a TAU in order to register with the E-UTRAN network and simulates the bearers by setting the bearer context information within TAU message to show that the UE supports 2 bearers (i.e., setting EBI 5=1 within EPS bearer context). It may also include the "active flag" within TAU in order to ensure appropriate radio bearers and S1 bearers are established in order to receive operator offered services using IMS. During the TAU procedure, the target MME may initiate a context request to obtain UE context information from the source ACS/eMME. The source ACS/eMME may provide context information (bearer level QoS, APN) information within EPS PDN connections to ensure necessary bearers are established for the UE to obtain IMS and internet services (i.e. QCI=1, QCI=5 bearers in our example). The 5G network may map the 5G QoS parameters (e.g., used DSCP packet marking values, other used QoS priority indicators defined for 5G) to EPC QoS parameters (i.e., mapped QoS). Mapping can be performed by ACS/eMME based on subscription information retrieved from the HSS or based on locally configured mapping tables. In addition, source ACS/eMME may obtain TEID information from M-GW/AR and M-GW/ER and provide it within the context response to the target MME in order to establish GTP tunnels in the LTE network. The MME may decide whether S-GW relocation is needed. If S-GW relocation is needed, then it may establish necessary GTP tunnels between eNB, S-GW and M-GW/ER. Otherwise, it may establish necessary GTP tunnels between eNB, M-GW/AR and M-GW/ER.

Another embodiment is directed to connected mode handover, for example from a LTE to a 5G network. A first aspect is directed to network initiated handover, which will be explained in connection with the following example. In this example, the UE wants to use operator offered services using IMS. In LTE, the UE uses IMS-APN, QCI 5 default bearer for signalling and QCI 1 dedicated bearer for voice.

In this example embodiment, the UE is registered in a LTE network and is assigned an IP address. The UE is connected to IMS APN and has 2 bearers—QCI 5 default bearer for IMS signaling, QCI 1 dedicated bearer for voice. The user plane for the UE is routed from the UE to eNB to S-GW to P-GW to IMS network.

Figure 5:
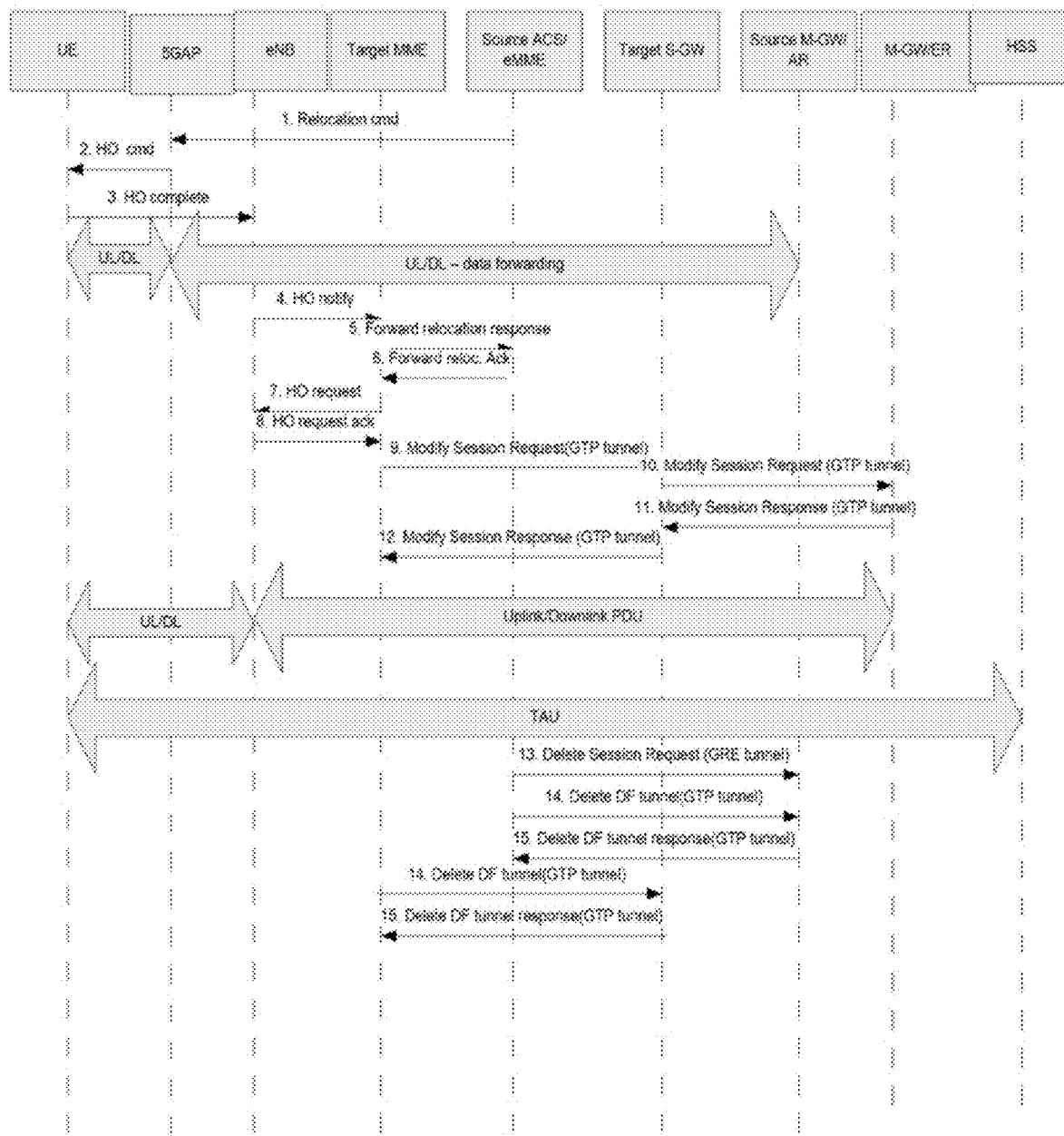
FIG. 5 illustrates a signaling diagram according to another embodiment.

FIG. 5 illustrates an example signalling diagram for interworking and network initiated connected mode handover execution from a LTE to a 5G network, according to an embodiment. According to this embodiment, based on UE mobility, current location, measurement and other parameters, the LTE eNB may determine that handover is required to another RAT and informs the new ACS/eMME that handover is required. Based on the target 5GAP indicator, the MME may detect that inter RAT handover is required. If the target 5GAP is not being served by the MME, the source MME determines the target ACS/eMME that controls the 5GAP and initiates the handover and provides necessary bearer context information in the forward relocation request. The target ACS/eMME prepares for the HO by setting up a GRE tunnel (or if needed, several tunnels to potentially different gateways) for the UE. This tunnel is used to route IP packets to and from the UE. It may also prepare for data forwarding from the source to the target system to ensure data integrity. QoS classification for ongoing service data flows is provided in the M-GW/ER directly (e.g., using deep packet inspection (DPI)) or QCI values retrieved from LTE are mapped to DSCP values by ACS/eMME and provided to M-GW/AR or M-GW/ER. M-GW/ER can use the packet filters that may be assigned to the different existing LTE bearers to set the correct DSCP values for the different service data flows. The source MME may create a tunnel to perform data forwarding and informs the LTE eNB that handover can be triggered with HO command. The UE may execute the handover by sending a handover indication to 5GAP and TAU to target ACS/eMME. During the handover execution phase, the target ACS/eMME may confirm the establishment of bearers towards the source MME and deactivate the (GRE, MIP, GTP, etc.) tunnel established for data forwarding. The source MME may use this trigger to deactivate the GTP tunnel(s) that were established in the LTE network for the UE. The following are two possibilities for the target UP path after handover: 1) 5GAP→M-GW/AR→P-GW/ER; 2) 5GAP→S-GW→P-GW/ER.

Another aspect is directed to UE initiated handover. The procedure for handover according to this embodiment is explained in connection with the following example. In this example, the UE wants to use operator offered services using IMS. In LTE, the UE uses IMS-APN, QCI 5 default bearer for signalling and QCI 1 dedicated bearer for voice. Again, in this embodiment, the UE is registered in a LTE network and is assigned an IP address. The UE is connected to IMS APN and has 2 bearers—QCI 5 default bearer for IMS signaling, QCI 1 dedicated bearer for voice. The user plane for the UE is routed from UE to eNB to S-GW to P-GW to IMS network.

According to this embodiment, in the connected mode, the UE may try to move towards 5G network directly. In this case, the handover preparation phase may be skipped. During the handover execution phase, 5GAP instructs the UE regarding handover and UE may provide information regarding the source network (e.g., source eNB ID, source MMEID). The UE can derive source MMEID (GUMMEI) from the GUTI assigned by the source MME and provide this to the target network. 5GAP can use source eNB information to obtain UE context information from the source eNB (just like in case of X2 handover). 5GAP can also use this information to route the UE to the appropriate ACS/eMME. If UE context information is not provided by the 5GAP, target ACS/eMME can use the source MME information provided by the UE to obtain UE context from the source MME. UE context information should include bearer context information including QoS, APN used for the PDN connectivity in LTE network. Based on this information, target ACS/eMME can choose the appropriate M-GW/AR and establish the session for the UE. The following are two possibilities for the target UP path after handover: 1) 5GAP→M-GW/AR→P-GW/ER; 2) 5GAP→S-GW→P-GW/ER.

Figure 6A:
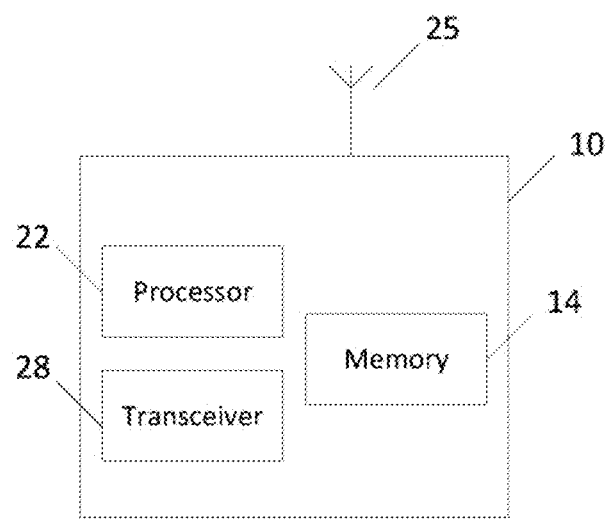
FIG. 6a illustrates a block diagram of an apparatus according to one embodiment.

FIG. 6a illustrates an example of an apparatus 10 according to an embodiment. In an embodiment, apparatus 10 may be a node, host, or server in a communications network or serving such a network. In one embodiment, apparatus 10 may be a node in a bearer-less network, such as an ACS/eMME in a 5G network. It should be noted that one of ordinary skill in the art would understand that apparatus 10 may include components or features not shown in FIG. 6a.

As illustrated in FIG. 6a, apparatus 10 includes a processor 22 for processing information and executing instructions or operations. Processor 22 may be any type of general or specific purpose processor. While a single processor 22 is shown in FIG. 6a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, as mentioned above, apparatus 10 may be a node in a bearer-less network, such as an ACS/eMME in a 5G network. According to an embodiment, apparatus 10 may be controlled by memory 14 and processor 22 to receive a context request to obtain user equipment context information for a user equipment moving from the bearer-less network to the bearer-based network. Apparatus 10 may be further controlled by memory 14 and processor 22 to provide a context response comprising the context information to a network entity in the bearer-based network. The context information may be used to establish bearers for the user equipment to obtain internet protocol (IP) multimedia subsystem (IMS) services.

In this embodiment, apparatus 10 may be further controlled by memory 14 and processor 22 to request establishment of IMS and internet PDN connection with the bearers and QoS parameters. The request may be based on services potentially used by the user equipment. Apparatus 10 may be further controlled by memory 14 and processor 22 to obtain TEID information and provide the TEID information within the context response to the network entity in the bearer-based network in order to establish GTP tunnels in the bearer-based network.

In another embodiment, apparatus 10 may be controlled by memory 14 and processor 22 to receive an initial attach or TAU request from a user equipment moving from a bearer-based network to a bearer-less network, to obtain bearer context information from an entity (e.g., MME) of the bearer-based network, to retrieve a mapping of bearer QCI to 5G QoS parameters (e.g., DSCP values, QoS priority related values), and to inform a gateway in the bearer-less network of the mapping. In this embodiment, apparatus 10 may be further controlled by memory 14 and processor 22 to determine whether SGW relocation is necessary and establish GTP tunnels towards a packet data network gateway (PGW) of the bearer-less network. Apparatus 10 may also be controlled by memory 14 and processor 22 to select an appropriate MGW to establish a session for the user equipment based, for example, on an indication of a type of service requested from the user equipment.

In another embodiment, apparatus 10 may be controlled by memory 14 and processor 22 to initiate handover of a user equipment from a bearer-less network to a bearer-based network, to map QoS parameters from different service flows of the bearer-less network to EPS bearer level QoS of the bearer-based network, to determine an APN to be used in the bearer-based network, to provide APN information within EPS PDN connections in a relocation request forwarded to the bearer-based network to establish appropriate bearers for the user equipment, and to send a handover command to the user equipment to trigger handover to the bearer-based network. In this embodiment, apparatus 10 may be further controlled by memory 14 and processor 22 to create a tunnel to perform data forwarding from the bearer-less to the bearer-based network. Apparatus 10 may also be controlled by memory 14 and processor 22 to de-activate tunnels that were established in the bearer-less network for the user equipment in response to a de-activation by the bearer-based network of the tunnel created for data forwarding.

In another embodiment, apparatus 10 may be controlled by memory 14 and processor 22 to receive an indication that handover of a user equipment from a bearer-based network to a bearer-less network is required, to prepare for the handover by setting up at least one generic routing encapsulation (GRE) tunnel for the user equipment, to map QCI values retrieved from the bearer-based network to 5G QoS parameters (e.g., DSCP values, QoS priority related values) and provide the mapping to a gateway in the bearer-less network, to receive a TAU message from the user equipment executing handover, and to confirm establishment of bearers to the bearer-based network and de-activate tunnel(s) established for data forwarding.

In another embodiment, apparatus 10 may be controlled by memory 14 and processor 22 to receive information about an evolved node B (eNB) and mobility management entity (MME) of a bearer-based network. The information may include the eNB ID and/or MMEID, and may be received from a user equipment moving from the bearer-based network to a bearer-less network. Apparatus 10 may then be controlled by memory 14 and processor 22 to use the information to obtain user equipment context information from the eNB, and to route the user equipment to an appropriate access control server. The user equipment context information may include, for example, bearer context information comprising quality of service (QoS) parameters and access point name (APN) used for packet data network connectivity in the bearer-based network.

Figure 6B:
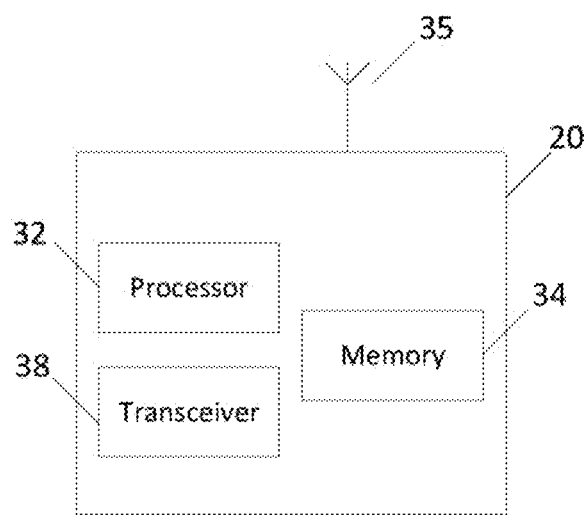
FIG. 6b illustrates a block diagram of an apparatus according to another embodiment.

FIG. 6b illustrates an example of an apparatus 20 according to an embodiment. In an embodiment, apparatus 20 may be a node, host, or server in a communications network or serving such a network. In one example, apparatus 20 may be a MME in a bearer-based network, such as LTE. It should be noted that one of ordinary skill in the art would understand that apparatus 20 may include components or features not shown in FIG. 6b.

As illustrated in FIG. 6b, apparatus 20 includes a processor 32 for processing information and executing instructions or operations. Processor 32 may be any type of general or specific purpose processor. While a single processor 32 is shown in FIG. 6b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include or be coupled to one or more antennas 35 for transmitting and receiving signals and/or data to and from apparatus 20. Apparatus 20 may further include or be coupled to a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 which may include, for example, precoding of antenna gain/phase parameters, encoding and decoding of individual bits forming a communication message, formatting of information, and overall control of the apparatus 20, including processes related to management of communication resources.

In an embodiment, memory 34 may store software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

In one embodiment, as mentioned above, apparatus 20 may be a node, host, or server in a communications network or serving such a network. In one example of this embodiment, apparatus 20 may be a MME in LTE. According to one embodiment, apparatus 20 may be controlled by memory 34 and processor 32 to receive a TAU to register with a bearer-based network from a user equipment moving from a bearer-less network to the bearer-based network, to initiate a context request to obtain context information from a network entity in the bearer-less network, and to receive the context information to establish bearers for the user equipment to obtain internet protocol (IP) multimedia subsystem (IMS) services.

In this embodiment, apparatus 20 may be further controlled by memory 34 and processor 32 to determine whether relocation of a SGW is needed. When it is determined that the relocation is needed, apparatus 20 may be controlled to establish GTP tunnels between an eNB, SGW, and a MGW/ER based on TEID information provided in the context information. When it is determined that the relocation is not needed, apparatus 20 may be controlled to establish GTP tunnels between the eNB, MGW/AR, and MGW/ER.

In another embodiment, apparatus 20 may be controlled by memory 34 and processor 32 to receive a relocation request comprising APN information for establishing appropriate bearers for a user equipment handover from a bearer-less network to a bearer-based network, to prepare for the handover by setting up GTP tunnels for the user equipment based in part on the received APN information, and to confirm establishment of the appropriate bearers to the bearer-less network.

In another embodiment, apparatus 20 may be controlled by memory 34 and processor 32 to detect that handover of a user equipment from a bearer-based network to a bearer-less network is required, to determine which entity in the bearer-less network controls an access point that will serve the user equipment, to initiate handover and provide bearer context information in a relocation request forwarded to the entity in the bearer-less network, and to create a tunnel to perform data forwarding and inform an eNB in the bearer-based network that handover can be triggered with a handover command. Apparatus 20 may also be controlled by memory 34 and processor 32 to de-activate general packet radio service (GPRS) tunnelling protocol (GTP) tunnels that were established in the bearer-based network.

Figure 6C:
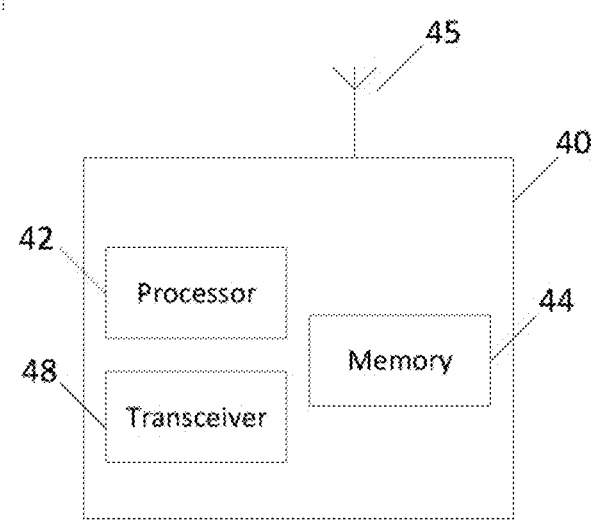
FIG. 6c illustrates a block diagram of an apparatus according to another embodiment.

FIG. 6c illustrates an example of an apparatus 40 according to an embodiment. In an embodiment, apparatus 40 may be a node, host, or server in a communications network or serving such a network. In one example, apparatus 40 may be a user equipment that supports both 5G and LTE radio technologies. It should be noted that one of ordinary skill in the art would understand that apparatus 40 may include components or features not shown in FIG. 6c.

As illustrated in FIG. 6c, apparatus 40 includes a processor 42 for processing information and executing instructions or operations. Processor 42 may be any type of general or specific purpose processor. While a single processor 42 is shown in FIG. 6c, multiple processors may be utilized according to other embodiments. In fact, processor 42 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 40 may further include or be coupled to a memory 44 (internal or external), which may be coupled to processor 42, for storing information and instructions that may be executed by processor 42. Memory 44 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 44 can be comprised of any combination of random access memory (RAM), read only memory (ROM), static storage such as a magnetic or optical disk, or any other type of non-transitory machine or computer readable media. The instructions stored in memory 44 may include program instructions or computer program code that, when executed by processor 42, enable the apparatus 40 to perform tasks as described herein.

Apparatus 40 may also include or be coupled to one or more antennas 45 for transmitting and receiving signals and/or data to and from apparatus 40. Apparatus 40 may further include or be coupled to a transceiver 48 configured to transmit and receive information. For instance, transceiver 48 may be configured to modulate information on to a carrier waveform for transmission by the antenna(s) 45 and demodulate information received via the antenna(s) 45 for further processing by other elements of apparatus 40. In other embodiments, transceiver 48 may be capable of transmitting and receiving signals or data directly.

Processor 42 may perform functions associated with the operation of apparatus 40 which may include, for example, precoding of antenna gain/phase parameters, encoding and decoding of individual bits forming a communication message, formatting of information, and overall control of the apparatus 40, including processes related to management of communication resources.

In an embodiment, memory 44 may store software modules that provide functionality when executed by processor 42. The modules may include, for example, an operating system that provides operating system functionality for apparatus 40. The memory may also store one or more functional modules, such as an application or program, to provide additional functionality for apparatus 40. The components of apparatus 40 may be implemented in hardware, or as any suitable combination of hardware and software.

In one embodiment, as mentioned above, apparatus 40 may be a node, host, or server in a communications network or serving such a network. In this embodiment, apparatus 40 may be a user equipment. According to one embodiment, apparatus 40 may be controlled by memory 44 and processor 42 to detect that the apparatus is moving from a bearer-less network to a bearer-based network, and to initiate a TAU message to register with the bearer-based network and simulate bearers by setting bearer context information within the TAU message to show that the apparatus supports two bearers. Apparatus 40 may also be controlled by memory 44 and processor 42 to include an active flag within the TAU message to ensure appropriate radio bearers and S1 bearers are established in order to receive operator offered services using IMS.

In another embodiment, apparatus 40 may be controlled by memory 44 and processor 42 to detect that the apparatus is moving from a bearer-based network to a bearer-less network, to perform initial attach to obtain IP connectivity from the bearer-less network or performing a TAU procedure to perform registration with the bearer-less network, and, when performing the initial attach or the TAU procedure, to provide QoS information to the bearer-less network. Apparatus 40 may also be controlled by memory 44 and processor 42 to indicate a type of service requested from the bearer-less network by including a service name with the initial attach or TAU procedure.

In another embodiment, apparatus 40 may be controlled by memory 44 and processor 42 to detect that the apparatus is moving from a bearer-based network to a bearer-less network, to provide, to an access point in the bearer-less network, information about an eNB and MME of the bearer-based network, and to execute handover from the bearer-based network to the bearer-less network. The information about the eNB and MME may include, for example, the eNB ID and/or the MMEID.

Figure 7A:
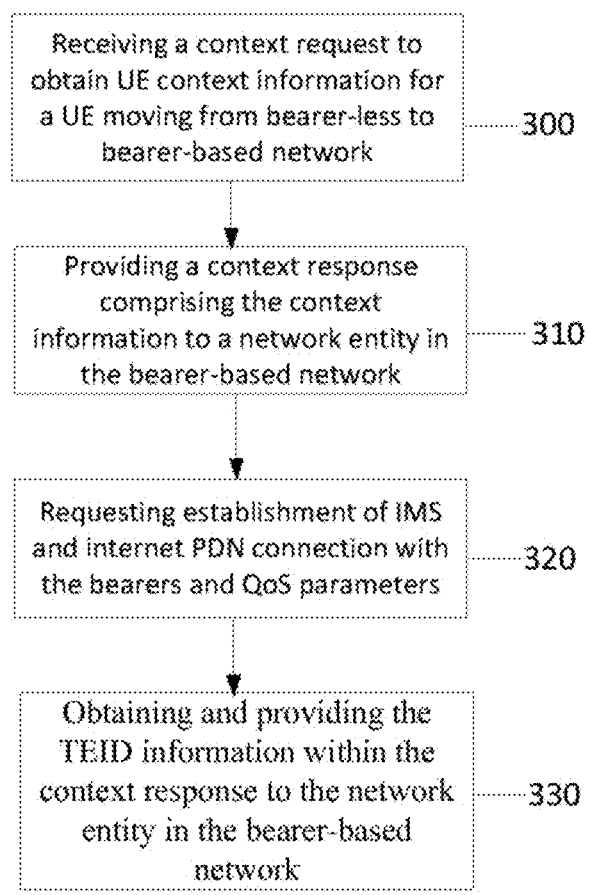
FIG. 7a illustrates a flow diagram of a method according to one embodiment.

FIG. 7a illustrates an example flow diagram of a method, according to one embodiment. In one example, the method of FIG. 7a may be performed by a network entity in a bearer-less network, such as an ACS/eMME in a 5G system. In an embodiment, the method may include, at 300, receiving a context request to obtain user equipment context information for a user equipment moving from the bearer-less network to a bearer-based network. The method may further include, at 310, providing a context response comprising the context information to a network entity in the bearer-based network, where the context information is used to establish bearers for the user equipment to obtain internet protocol (IP) multimedia subsystem (IMS) services. The method may also include, at 320, requesting establishment of IMS and internet PDN connection with the bearers and QoS parameters. The request may be based on services potentially used by the user equipment. The method may also include, at 330, obtaining TEID information and providing the TEID information within the context response to the network entity in the bearer-based network in order to establish GTP tunnels in the bearer-based network.

Figure 7B:
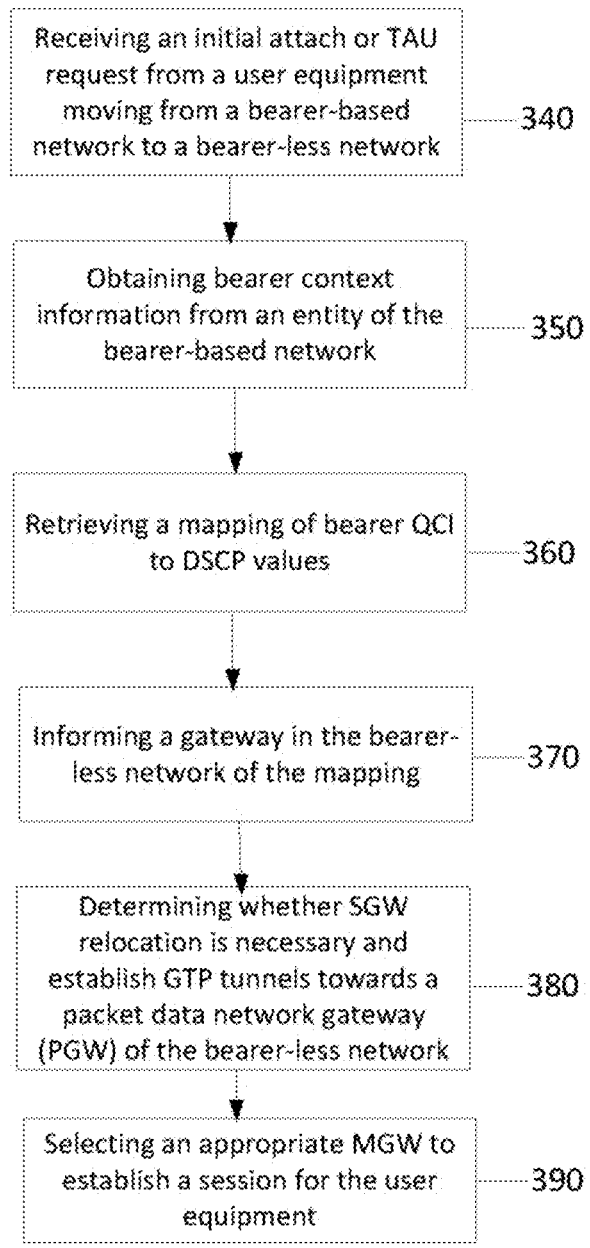
FIG. 7b illustrates a flow diagram of a method according to another embodiment.

FIG. 7b illustrates an example flow diagram of a method, according to one embodiment. In one example, the method of FIG. 7b may be performed by a network entity in a bearer-less network, such as an ACS/eMME in a 5G system. In an embodiment, the method may include, at 340, receiving an initial attach or TAU request from a user equipment moving from a bearer-based network to a bearer-less network. The method may also include, at 350, obtaining bearer context information from an entity (e.g., MME) of the bearer-based network, and, at 360, retrieving a mapping of bearer QCI to 5G QoS parameters (e.g., DSCP values, QoS priority related parameters). The method may also include, at 370, informing a gateway in the bearer-less network of the mapping. In an embodiment, the method may also include, at 380, determining whether SGW relocation is necessary and establish GTP tunnels towards a packet data network gateway (PGW) of the bearer-less network. The method may also include, at 390, selecting an appropriate MGW to establish a session for the user equipment based, for example, on an indication of a type of service requested from the user equipment.

Figure 7C:
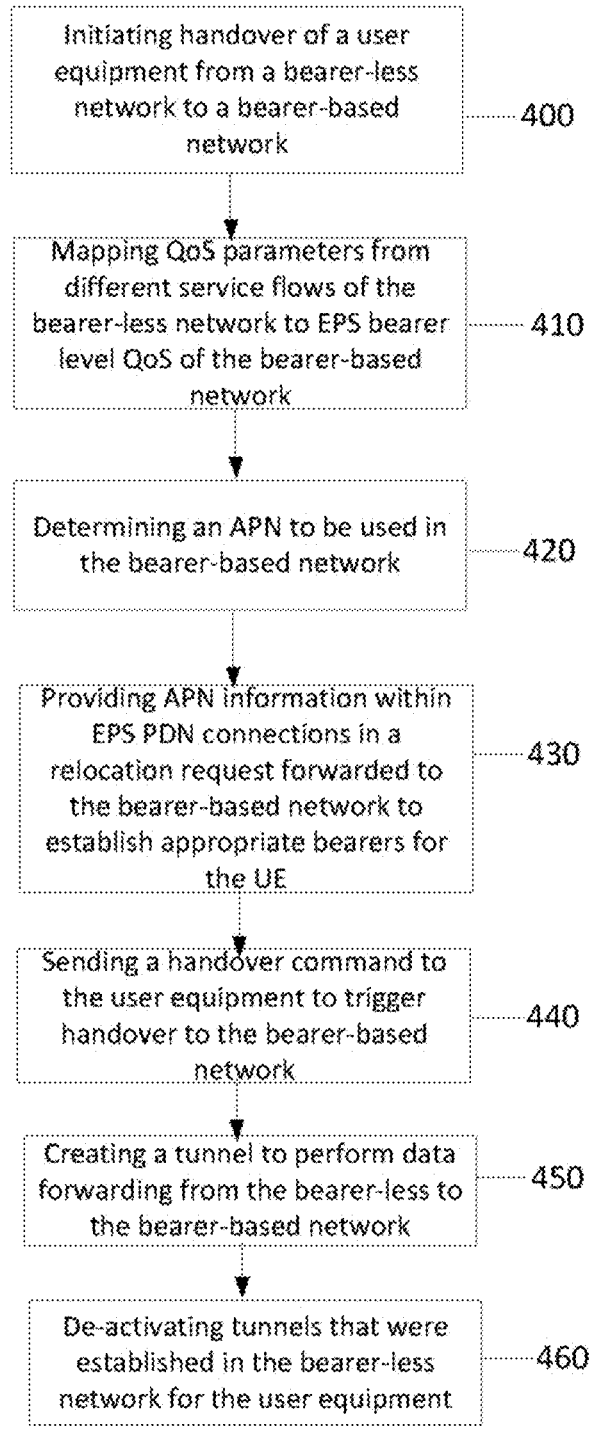
FIG. 7c illustrates a flow diagram of a method according to another embodiment.

FIG. 7c illustrates an example flow diagram of a method, according to one embodiment. In one example, the method of FIG. 7c may be performed by a network entity in a bearer-less network, such as an ACS/eMME in a 5G system. In an embodiment, the method may include, at 400, initiating handover of a user equipment from a bearer-less network to a bearer-based network, and, at 410, mapping QoS parameters from different service flows of the bearer-less network to EPS bearer level QoS of the bearer-based network. The method may also include, at 420, determining an APN to be used in the bearer-based network, and, at 430, providing APN information within EPS PDN connections in a relocation request forwarded to the bearer-based network to establish appropriate bearers for the user equipment. The method may also include, at 440, sending a handover command to the user equipment to trigger handover to the bearer-based network. In an embodiment, the method may include, at 450, creating a tunnel to perform data forwarding from the bearer-less to the bearer-based network. The method may also include, at 460, de-activating tunnels that were established in the bearer-less network for the user equipment in response to a de-activation by the bearer-based network of the tunnel created for data forwarding.

Figure 7D:
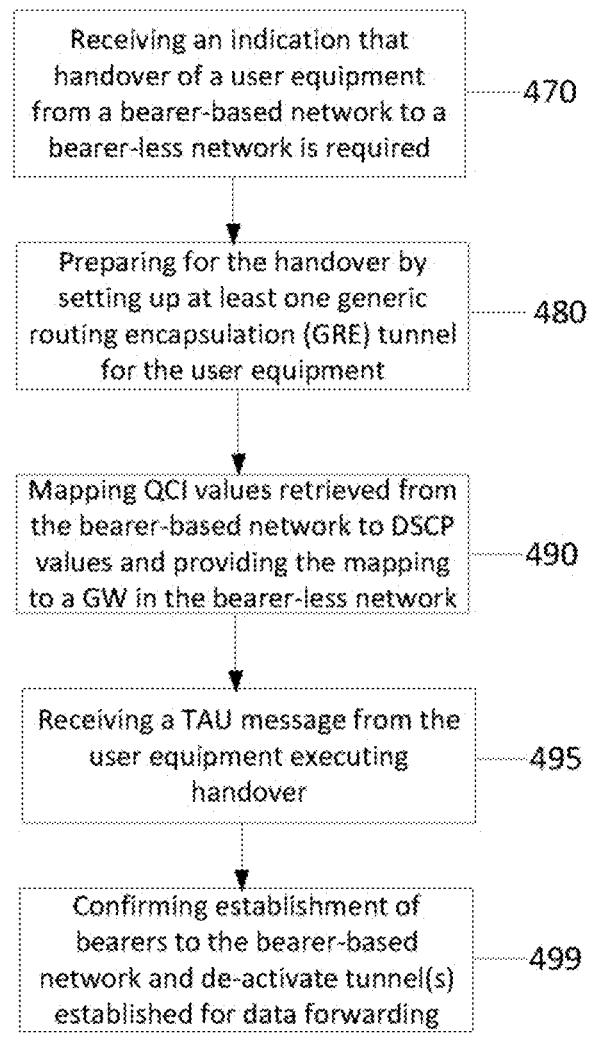
FIG. 7d illustrates a flow diagram of a method according to another embodiment.

FIG. 7d illustrates an example flow diagram of a method, according to one embodiment. In one example, the method of FIG. 7d may be performed by a network entity in a bearer-less network, such as an ACS/eMME in a 5G system. In an embodiment, the method may include, at 470, receiving an indication that handover of a user equipment from a bearer-based network to a bearer-less network is required, and, at 480, preparing for the handover by setting up at least one generic routing encapsulation (GRE) tunnel for the user equipment. The method may also include, at 490, mapping QCI values retrieved from the bearer-based network to 5G QoS parameters (e.g., DSCP values, QoS priority related parameters) and providing the mapping to a gateway in the bearer-less network. The method may also include, at 495, receiving a TAU message from the user equipment executing handover, and, at 499, confirming establishment of bearers to the bearer-based network and de-activate tunnel (s) established for data forwarding.

Figure 7E:
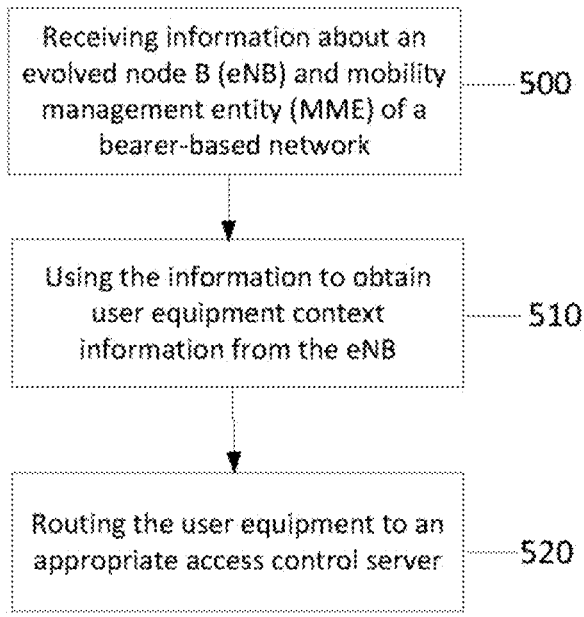
FIG. 7e illustrates a flow diagram of a method according to another embodiment.

FIG. 7e illustrates an example flow diagram of a method, according to one embodiment. In one example, the method of FIG. 7e may be performed by a network entity in a bearer-less network, such as a 5GAP or ACS/eMME in a 5G system. In an embodiment, the method may include, at 500, receiving information about an evolved node B (eNB) and mobility management entity (MME) of a bearer-based network. The information may include the eNB ID and/or MMEID, and may be received from a user equipment moving from the bearer-based network to a bearer-less network. The method may also include, at 510, using the information to obtain user equipment context information from the eNB, and, at 520, routing the user equipment to an appropriate access control server. The user equipment context information may include, for example, bearer context information comprising quality of service (QoS) parameters and access point name (APN) used for packet data network connectivity in the bearer-based network.

Figure 8A:
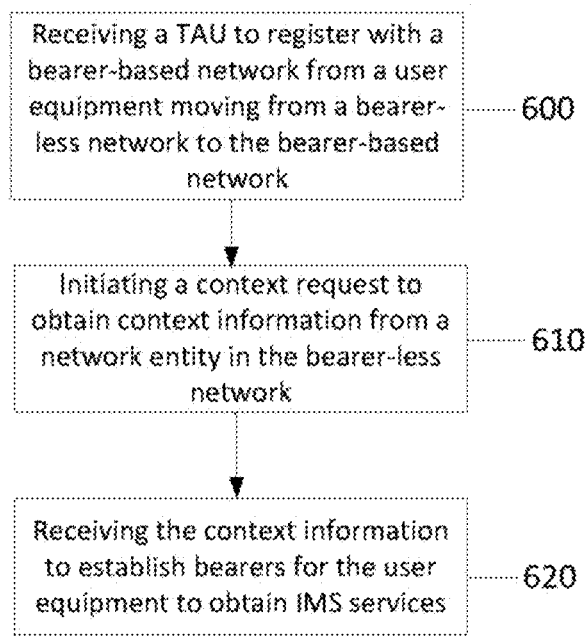
FIG. 8a illustrates a flow diagram of a method according to another embodiment.

FIG. 8a illustrates an example flow diagram of a method, according to one embodiment. In one example, the method of FIG. 8a may be performed by a network entity in a bearer-based network, such as a MME in a LTE system. In an embodiment, the method may include, at 600, receiving a TAU to register with a bearer-based network from a user equipment moving from a bearer-less network to the bearer-based network. The method may also include, at 610, initiating a context request to obtain context information from a network entity in the bearer-less network, and, at 620, receiving the context information to establish bearers for the user equipment to obtain IMS services. In some embodiments, the method may further include determining whether relocation of a SGW is needed. When it is determined that the relocation is needed, the method may include establishing GTP tunnels between an eNB, SGW, and a MGW/ER based on TEID information provided in the context information. When it is determined that the relocation is not needed, the method may include establishing GTP tunnels between the eNB, MGW/AR, and MGW/ER.

Figure 8B:
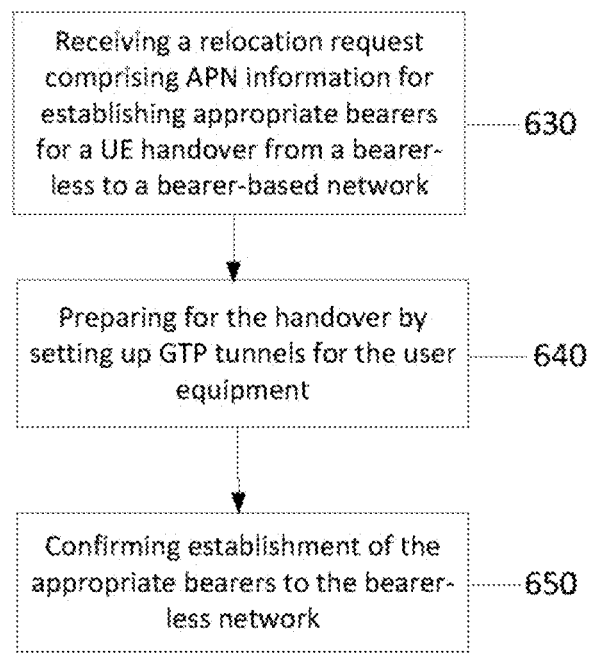
FIG. 8b illustrates a flow diagram of a method according to another embodiment.

FIG. 8b illustrates an example flow diagram of a method, according to one embodiment. In one example, the method of FIG. 8b may be performed by a network entity in a bearer-based network, such as a MME in a LTE system. In an embodiment, the method may include, at 630, receiving a relocation request comprising APN information for establishing appropriate bearers for a user equipment handover from a bearer-less network to a bearer-based network. The method may then include, at 640, preparing for the handover by setting up GTP tunnels for the user equipment based in part on the received APN information, and, at 650, confirming establishment of the appropriate bearers to the bearer-less network.

Figure 8C:
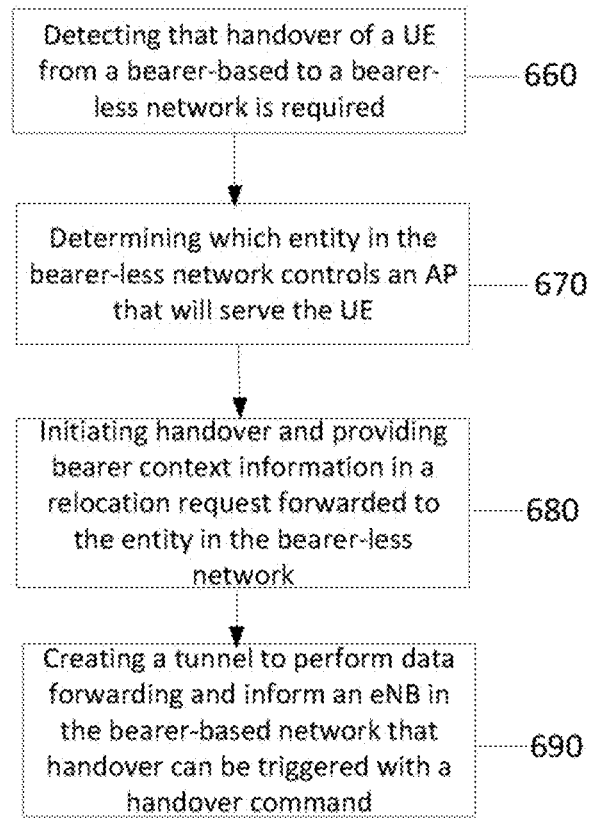
FIG. 8c illustrates a flow diagram of a method according to another embodiment.

FIG. 8c illustrates an example flow diagram of a method, according to one embodiment. In one example, the method of FIG. 8c may be performed by a network entity in a bearer-based network, such as a MME in a LTE system. In an embodiment, the method may include, at 660, detecting that handover of a user equipment from a bearer-based network to a bearer-less network is required, and, at 670, determining which entity in the bearer-less network controls an access point that will serve the user equipment. The method may also include, at 680, initiating handover and providing bearer context information in a relocation request forwarded to the entity in the bearer-less network, and, at 690, creating a tunnel to perform data forwarding and inform an eNB in the bearer-based network that handover can be triggered with a handover command. The method may also include de-activating general packet radio service (GPRS) tunnelling protocol (GTP) tunnels that were established in the bearer-based network.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   detecting, by a user equipment, that the user equipment is moving from a bearer-based network to a bearer-less network;
   performing initial attach to obtain internet protocol (IP) connectivity from the bearer-less network or performing a tracking area update (TAU) procedure to perform registration with the bearer-less network; and
   when performing the initial attach or the TAU procedure, providing quality of service (QoS) information to the bearer-less network.

2. The method according to claim 1, further comprising indicating a type of service requested from the bearer-less network by including a service name with the initial attach or TAU procedure.

3. The method according to claim 1, wherein the user equipment is in idle mode.

4. The method according to claim 1, wherein the bearer-less network comprises a 5th generation wireless network (5G).

5. The method according to claim 1, wherein the bearer-based network comprises a long term evolution (LTE) network.

6. The method according to claim 1, wherein the user equipment performing initial attach causes a target core network entity of the bearer-less network to obtain context information from a source core network entity of the bearer-based network.

7. The method according to claim 6, wherein the bearer context information comprises at least one of APN and bearer level QoS.

8. A method according to claim 6, wherein the target core network entity of the bearer-less network has a mapping table between bearer QCI and DSCP values.

9. A method according to claim 6, wherein the target core network entity of the bearer-less network retrieves mapping information between bearer QCI and DSCP values from a central database that contains user-related and subscription-related information.

10. An apparatus, comprising:
    at least one processor; and
    at least one memory including computer program code,
    wherein the at least one memory and the computer program code are configured, with the at least one processor, to cause the apparatus at least to
    detect that the apparatus is moving from a bearer-based network to a bearer-less network;
    perform initial attach to obtain internet protocol (IP) connectivity from the bearer-less network or performing a tracking area update (TAU) procedure to perform registration with the bearer-less network; and
    when performing the initial attach or the TAU procedure, provide quality of service (QoS) information to the bearer-less network.

11. The apparatus according to claim 10, wherein the at least one memory and the computer program code are further configured, with the at least one processor, to cause the apparatus at least to indicate a type of service requested from the bearer-less network by including a service name with the initial attach or TAU procedure.

12. The apparatus according to claim 10, wherein the apparatus comprises a user equipment in idle mode.

13. The apparatus according to claim 10, wherein the bearer-less network comprises a 5th generation wireless network (5G).

14. The apparatus according to claim 10, wherein the bearer-based network comprises a long term evolution (LTE) network.

15. The apparatus according to claim 10, wherein the user equipment performing initial attach causes a target core network entity of the bearer-less network to obtain context information from a source core network entity of the bearer-based network.

16. The apparatus according to claim 15, wherein the bearer context information comprises at least one of APN and bearer level QoS.

17. The apparatus according to claim 15, wherein the target core network entity of the bearer-less network has a mapping table between bearer QCI and DSCP values.

18. The apparatus according to claim 15, wherein the target core network entity of the bearer-less network retrieves mapping information between bearer QCI and DSCP values from a central database that contains user-related and subscription-related information.

19. A computer program, embodied on a computer readable medium, the computer program configured to control a processor to perform a method according to claim 1.

* * * * *